United States Patent [19]

Saigo et al.

[11] Patent Number: 4,901,528
[45] Date of Patent: Feb. 20, 1990

[54] SYSTEM FOR SUPPRESSING NOISE DUE TO EXHAUST GAS FROM MOTOR VEHICLE

[75] Inventors: Fumitaka Saigo, Atsugi City; Akira Azuma, Fujisawa City; Ryoichi Nakagawa, Tokyo, all of Japan

[73] Assignee: Nissan Motor Co., Ltd., Japan

[21] Appl. No.: 297,649

[22] Filed: Jan. 17, 1989

[30] Foreign Application Priority Data

Jan. 16, 1988 [JP] Japan .................................. 63-7187

[51] Int. Cl.⁴ ..................... F02B 27/02; F01N 7/00
[52] U.S. Cl. ..................... 60/312; 181/236; 181/239; 181/254; 181/265
[58] Field of Search ................... 60/312; 181/236, 239, 181/254, 265

[56] References Cited

U.S. PATENT DOCUMENTS 4,665,692  5/1987  Inaba ..................................... 60/312

FOREIGN PATENT DOCUMENTS 62-126217  6/1967  Japan .
102508     6/1982  Japan ..................................... 60/312
74325      4/1984  Japan ..................................... 60/312

Primary Examiner—Douglas Hart
Attorney, Agent, or Firm—Lowe, Price, LeBlanc, Becker & Shur

[57] ABSTRACT

In an automotive vehicle installed with a V-6 engine, engine revolution speed and engine load are detected and a selector valve provided in a silencer is normally closed but it is opened when the engine revolution speed exceeds a predetermined engine revolution speed value when the 3rd order component of exhaust sound coincides with a longitudinal resonance frequency within a vehicle cabin when the vehicle is at acceleration. The selector valve which is normally closed is opened when the engine revolution speed exceeds a second predetermined engine revolution speed value when the 1.5th order component of the exhaust sound coincides with the longitudinal resonance frequency.

2 Claims, 3 Drawing Sheets

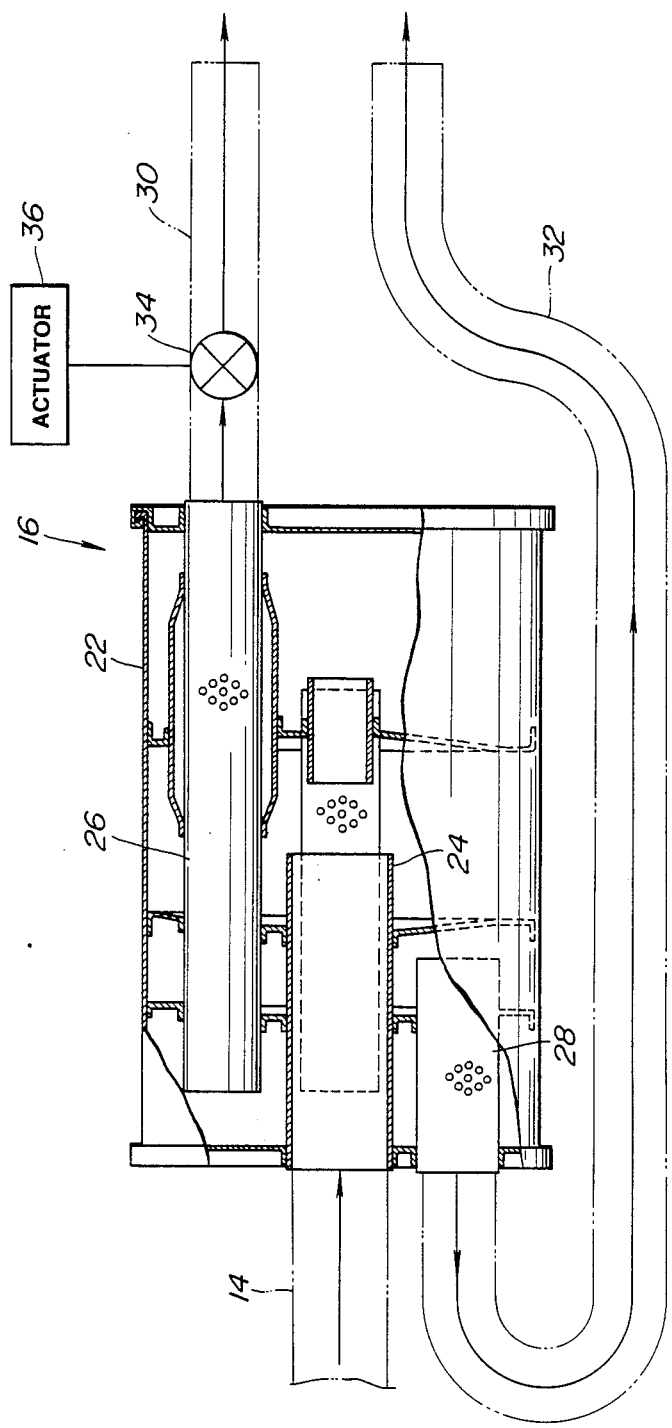

SYSTEM FOR SUPPRESSING NOISE DUE TO EXHAUST GAS FROM MOTOR VEHICLE

BACKGROUND OF THE INVENTION

The present invention relates to a system for suppressing noise due to exhaust gas issued from an engine of an automotive vehicle, and more particularly to such a system which includes a silencer whereby exhaust resistance is varied to enhance noise suppressing performance or engine output performance depending on operating conditions of the automotive vehicle.

JP No. 62-126217 discloses a noise suppressing system of the above kind. In this known noise suppressing system, a silencer is employed which exhibits noise suppressing performance variable in response to revolution speed of an engine of an automotive vehicle and load on the engine. More particularly, exhaust resistance provided by the silencer is varied by a selector valve such that the selector valve is closed to set a relatively great exhaust resistance for increased noise suppressing effect when the automotive vehicle passes through city area where the engine operates with a relatively light load, whereas the selector valve is opened to decrease exhaust resistance for increased engine output performance when the vehicle travels at high speeds or at acceleration where the engine operates with a heavy load.

However, this conventional known noise suppressing system is not effective enough to suppress internal sound created within the vehicle cabin due to exhaust sound.

An object of the present invention is to improve a system for suppressing noise due to exhaust gas issued from an engine of an automotive vehicle such that internal sound created within the vehicle cabin due to exhaust sound is considerably suppressed while keeping its noise suppressing performance and engine output performance demanded depending on operating conditions of the vehicle at sufficiently high levels.

SUMMARY OF THE INVENTION

According to the present invention, an automotive vehicle is provided with:

a vehicle cabin;

an engine having 2M cylinders, where M is any positive integer, said engine having a first group of M cylinders connected to a first exhaust manifold and a second group of the remaining M cylinders connected to a second exhaust manifold, said first and second exhaust manifolds are joined at a predetermined portion and having different fluid flow paths in length down to said predetermined portion;

a silencer connected to said first and second exhaust manifolds at said predetermined portion, said silencer including selector valve means whereby said silencer alters exhaust resistance thereof;

means for detecting engine revolution speed of said engine and generating a first output signal;

means for detecting engine load on said engine and generating a second output signal;

control means responsive to said first and second output signals for normally closing said selector valve means, but opening same when the engine revolution speed indicated by said first output signal exceeds a first predetermined engine revolution speed value when the M th order componenet of exhaust noise coincides with a predetermined resonance frequency within said vehicle cabin when said second output signal indicates that the vehicle is at acceleration, said control means being operative to normally closing said selector valve means, but opening same when the engine revolution speed indicated by said first output signal exceeds a second predetermined engine revolution speed value when the 2/M th order component of the exhaust noise coincides with said predetermined resonance frequency within said vehicle cabin when said second output signal indicates that the vehicle is at deceleration.

BRIEF DESCRIPTION OF THE DRAWINGS

FIG. 2 is an enlarged diagrammatic view of a silencer partly broken away to show section thereof;

DETAILED DESCRIPTION OF THE INVENTION

Referring to the accompanying drawings, the present invention is described in detail.

Figure 1:
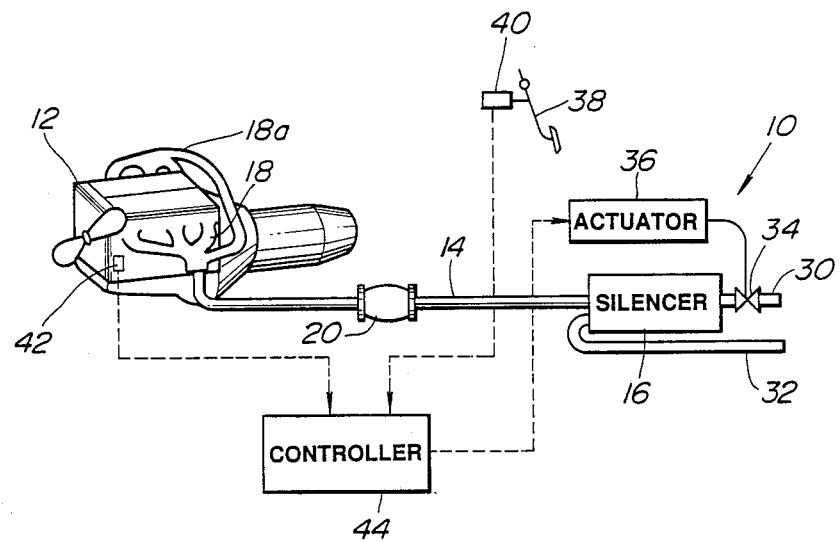
FIG. 1 is a schematic diagram of a system according to the present invention.

FIG. 1 shows a preferred embodiment generally denoted by the reference numeral 10 where the present invention is applied to an automotive vehicle including an engine 12, an exhaust pipe 14, a silencer 16 connected to the exhaust pipe 14.

The engine 12 is in the form of a V-6 engine where during first revolution of crankshaft combustion occurs three times and during the subsequent second revolution of crankshaft combustion occurs three times since this engine is a 4-cycle 6-cylinder engine. Thus, exhaust sound occurs three times during each revolution of crankshaft.

Connected to the above-mentioned exhaust pipe 14 are a first exhaust manifold 18 connected to three cylinders on one side and a second exhaust manifold 18a connected to the other three cylinders on the other side. Denoted by the reference numeral 20 is a catalytic converter.

Referring also to FIG. 2, the silencer 16 includes a fluid-tight casing 22, an inlet pipe 24 for exhaust gas introduction, two outlet pipes 26 and 28 for exhaust gas discharge. Coupled with the inlet pipe 24 is the above-mentioned exhaust pipe 14, while coupled with the outlet pipes 26 and 28 are a first and a second tail tubes 30 and 32, respectively.

Provided in the first tail tube 30 is a selector valve 34 which is normally closed to close the first tail tube 30. When the selector valve 34 is activated by an actuator 36 to open the first tail tube 30, exhaust resistance is reduced for increased output of the engine. When the selector valve 34 closes the first tail tube 30, exhaust resistance is increased for increased noise suppressing effect.

The selector valve 34 is opened or closed in response to engine load and engine revolution speed.

In order to measure or detect magnitude of engine load, an accelerator depression degree sensor 40 is provided in association with an accelerator pedal 38. In order to measure or detect engine revolution speed, a revolution speed sensor 42 is provided on the engine 12. Output signals of these sensors 40 and 42 are fed to a controller 44 where the timing when the above mentioned selector valve 34 is opened or closed is determined in accordance with a predetermined schedule based on the informations derived from the signals from the sensors 40 and 42.

In this controller 44, whether the automotive vehicle is at acceleration or deceleration is judged in response to the signal from the accelerator depression degree sensor 40. In this embodiment, one half of the full accelerator pedal depression degree is set as the criteria for the above-mentioned judgement.

In response to the signal from the engine revolution speed sensor 42, the controller 44 determines when the selector valve 34 should open or close when the vehicle is at acceleration and determines when the selector valve 34 should open or close when the vehicle is at deceleration.

More precisely, it determines when the selector valve 34 is opened versus engine revolution speed with due regard to magnitude of internal noise without any sacrifice on noise suppressing effect due to closing of the valve 34 and engine output increasing effect due to opening of the valve 34. Since the internal noise increases to a peak when a cabin of the vehicle resonates, the timing at which the selector valve 34 is opened is determined with due regard to a longitudinal direction resonance frequency (gamma) with a cabin of the vehicle.

Figure 3:
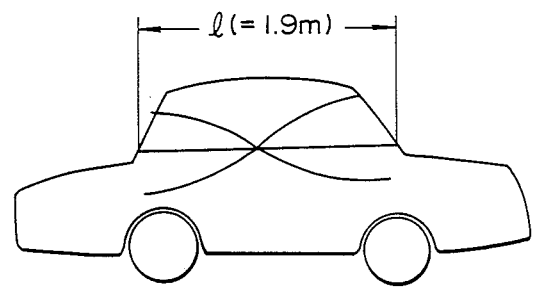
FIG. 3 is a diagram of an automotive vehicle.

The above-mentioned frequency $\gamma$ (gamma) is determined by a longitudinal length l (el) of the vehicle cabin, and can be illustrated by a standing wave with the above-mentioned length l (el) as one half of its wavelength as shown in FIG. 3.

Thus, the resonance frequency is expressed by:

$$\gamma = C/l \times \tfrac{1}{2} \quad (1)$$

(C: sonic speed = 340 m/sec.). The constant $\tfrac{1}{2}$ is a condition for a standing wave with one half wavelength equal to l (el).

If l=1.9 m, the resonance frequency $\gamma$ (gamma) is given by the equation (1) as follows:

$$\gamma = 340/1.9 \times \tfrac{1}{2} 89.5 \text{ (Hz)}.$$

Nextly, an engine revolution speed at which one of various order components of exhaust sound coincides with the above-mentioned resonance frequency $\gamma$ (gamma).

The order component indicates a number of occurrences of impact sound (exhaust sound) derived from combustion stroke of the engine and transmitted to the exhaust pipe 14 during one revolution of crankshaft. For example, the 3rd order component indicates three occurrences of exhaust sound during one revolution of crankshaft, while the 1.5th order component indicates one and one half occurrence of exhaust sound during one revolution of crankshaft. One and one half occurrences of exhaust sound during one revolution of crankshaft are caused by a difference in length between the exhaust manifolds 18 and 18a.

It is experimentally confirmed that the 3rd order component becomes distinct when engine load is heavy or great as when the vehicle is at acceleration, for example, and the 1.5th order component becomes distinct when engine load is light or small as when the vehicle is at deceleration, for example.

Accordingly, an engine revolution speed $N_3$ at which the 3rd order component coincides with the resonance frequency $\gamma$ (gamma) is expressed by the following equation:

$$N_3 = 60/n \times \gamma = 60/3 \times 89.5 = 1790 \text{ (rpm)}.$$

An engine revolution speed $N_{1.5}$ at which the 1.5th order component coincides with the resonance frequency $\gamma$ (gamma) is expressed by the following equation:

$$N_{1.5} = 60/1.5 \times 89.5 = 3580 \text{ (rpm)}.$$

At the engine revolution speeds $N_3$ (=1790 rpm) and $N_{1.5}$ (=3580 rpm), there are peaks of internal sound within the vehicle cabin.

Figure 6:
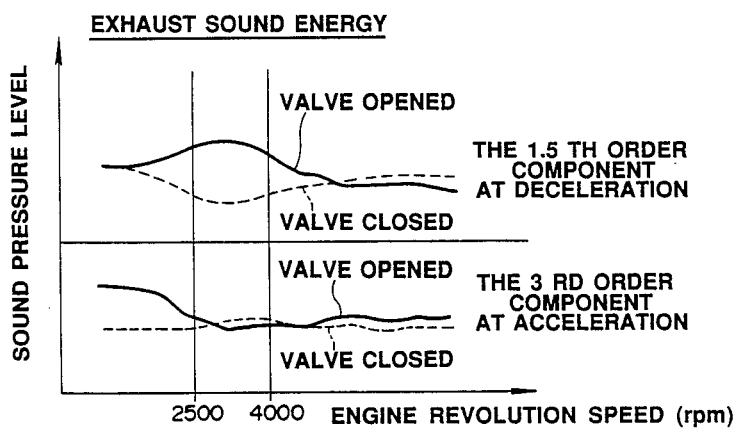
FIG. 6 is a graph illustrating variations of noise pressure level of exhaust noise versus engine revolution speeds.

As shown in FIG. 6, when the vehicle is at acceleration with the selector valve 34 kept open, exhaust sound energy of the 3rd component becomes distinct at engine revolution speed falling in a range from zero to 2000 rpm, which range overlaps the above-mentioned engine revolution speed $N_3$, while when the vehicle is at deceleration with the selector valve 34 kept open, exhaust sound energy of the 1.5th component becomes distinct at engine revolution speed falling in a range that overlaps the engine revolution speed $N_{1.5}$.

Therefore, if the selector valve 34 is kept open when the vehicle is at acceleration at engine revolution speed falling in the range that overlaps the engine revolution speed $N_3$ when the internal sound with the 3rd component has a peak, the increased exhaust sound energy has influence on the inside of the vehicle cabin, inducing an increase in the internal sound. Similarly, if the selector valve 34 is kept open when the vehicle is at deceleration at engine revolution speed falling in the range that overlaps the engine revolution speed $N_{1.5}$ when internal sound having the 1.5th order component has a peak, the increased exhaust sound energy has influence on the inside of the vehicle cabin, inducing an increase in the internal sound.

It is therefore necessary to close the selector valve 34 thereby to suppress the exhaust sound energy during engine revolution speed ranges where the above-mentioned 3rd and 1.5th order components become distinct, respectively.

Referring to FIG. 6, the fully drawn curves represent sound pressure level characteristic when the vehicle is at acceleration with the selector valve 34 kept open and that when the vehicle is at deceleration with the selector valve 34 kept open, respectively, while the broken curves represent sound pressure level characteristic when the vehicle is at acceleration with the selector valve 34 kept closed and that when the vehicle is at deceleration with the selector valve 34 kept closed.

Figure 4:
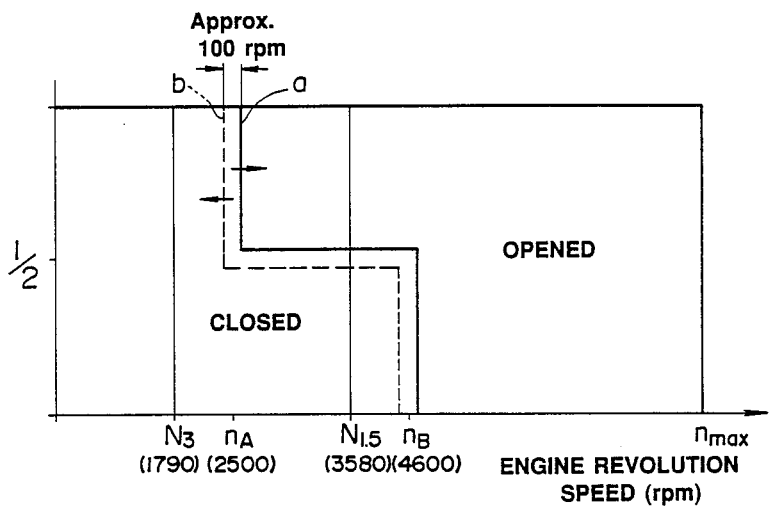
FIG. 4 is a scheduling diagram illustrating when a selector valve is to open.

In view of the above, the selector valve 34 is opened or closed in accordance with a schedule diagram as shown in FIG. 4 according to the present invention.

In the schedule diagram shown FIG. 4, the horizontal axis represents engine revolution speed, the vertical axis represents accelerator depression degree, one half of the full accelerator depression degree is set as the criteria whether the vehicle is at acceleration or deceleration, an engine revolution speed $n_4$ is set as the criteria whether the selector valve 34 is opened or closed when the vehicle is at acceleration, and an engine revolution speed $n_B$ is set as the criteria whether the selector valve 34 is opened or closed when the vehicle is at deceleration.

The above-mentioned revolution speed $n_A$ is set equal to a speed value of 2500 rpm in this embodiment considering a safe range with a width of several hundreds (several 100 rpm) higher than the engine revolution speed $N_3$ (=1790 rpm), while the revolution speed $n_B$ is set equal to a speed value of 4600 rpm considering an enough safe range higher than the engine revolution speed $N_{1.5}$ (=3580 rpm).

The width of each of the safe ranges is not limited to the above. The width of the safe range at acceleration may be set equal to any appropriate value with due regard to a range where increased engine output is demanded, a range where internal sound becomes distinct, and a range where exhaust sound energy increases. The width of the safe range at deceleration may be set equal to any appropriate value with due regard to a range where exhaust sound suppressing effect is demanded, and a range where exhaust sound energy increases.

Referring to FIG. 4, the fully drawn shift line a represents a set of shift points, each at which the selector valve 34 changes from its closed state to its opened state with the same accelerator depression degree, while the broken shift line b represents a set of shift points, each at which the selector valve 34 changes from its opened state to its closed state with the same accelerator pedal depression degree. With the same accelerator depression degree, a difference between a shift point on the fully drawn shift schedule line and a shift point on the broken shift schedule line is approximately 100 rpm.

Since the selector valve 34 is opened or closed in accordance with the schedule diagram shown in FIG. 4, the selector valve 34 is closed at around the engine revolution speed $N_3$ (=1790 rpm) when the vehicle is at acceleration where the accelerator depression degree is greater than $\frac{1}{2}$ of the full accelerator depression degree, and the selector valve 34 is closed at around the engine revolution speed $N_{1.5}$ (=3580 rpm) when the vehicle is at deceleration where the accelerator depression degree is less than $\frac{1}{2}$ of the full accelerator depression degree. Thus, the 3rd order component of exhaust sound energy is suppressed as shown in FIG. 6 at around the engine revolution speed $N_3$ when the vehicle is at acceleration, while the 1.5th order component thereof is suppressed as shown in FIG. 6 at around the engine revolution speed $N_{1.5}$ when the vehicle is at deceleration.

Figure 5:
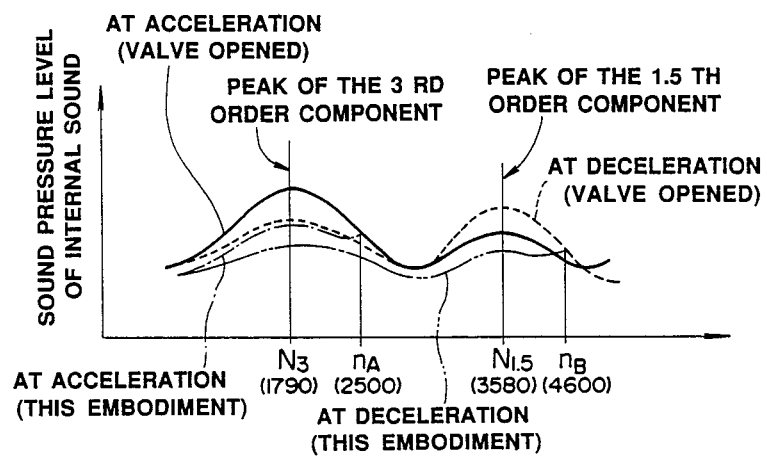
FIG. 5 is a graph illustrating variations of noise pressure level of internal noise versus engine revolution speeds.

Therefore, when the vehicle is at acceleration, the influence of exhaust sound on the inside of the vehicle cabin at around the engine revolution speed $N_3$ is decreased. As shown in FIG. 5, sound level of internal sound drops from the level as shown by the fully drawn line to a lower level as shown by the one-dot-chain line at engine revolution speed $N_3$ where the 3rd order component has its peak. The internal sound level within the vehicle cabin is greately decreased, resulting in a considerable reduction in the level of internal sound.

When the vehicle is at deceleration, therefore, the influence of exhaust sound on the inside of the vehicle cabin is decreased so that, as shown in FIG. 5, the sound level of internal sound decreases from the level shown by the broken line curve to the level shown by the two-dot-chain line curve at engine revolution speed $N_{1.5}$ where the 1.5th order component has its peak. This results in considerable reduction of internal sound within the vehicle cabin.

It is now appreciated from the preceding description that the shift schedule line is set at a relatively low engine revolution speed when the vehicle is at acceleration, so that a range where the engine output increase is emphasized has extended toward the lower engine revolution speed side, while the shift schedule line is set at a relatively high engine revolution speed when the vehicle is at deceleration, so that a range where the noise suppression is emphasized has extended toward the higher engine revolution speed side.

It is also appreciated that since the hysteresis is provided to prevent hunting of selector valves 34, the variation in output of the engine owing to the hunting is prevented.

Although in the previously described embodiment the accelerator depression degree sensor 40 is employed as means for detecting engine load, a vacuum sensor for detecting inlet vacuum to the engine or a temperature sensor provided for detecting exhaust temperature passing through the exhaust pipe 14 may be used as an alternative to the accelerator depression degree sensor 40.

Although in the previously described embodiment $\frac{1}{2}$ of the full accelerator depression degree is set as the criteria whether the vehicle is at acceleration or at deceleration, this criteria may be set at any appropriate value depending on a kind of an engine which the present invention is applied.

Although the V-6 engine is employed in the previously described embodiment, the present invention may be applied to any engine having 2M cylinders with M cylinders connected to one exhaust manifold and the remaining M cylinders connected to second exhaust manifold. The first and second exhaust maniolds are joined at a predetermined portion and have different fluid flow paths which are different in length down to the predetermined portion. M is any positive integer.

What is claimed is:

1. In an automotive vehicle:
   a vehicle cabin;
   an engine having an even number of cylinders, said engine having a first group of half of the cylinders connected to a first exhaust manifold and a second group of the remaining cylinders connected to a second exhaust manifold, said first and second exhaust manifolds are joined at a predetermined portion and having different fluid flow paths in length down to said predetermined portion;
   a silencer connected to said first and second exhaust manifolds at said predetermined portion, said silencer including selector valve means whereby the exhaust resistance of silencer is altered;
   means for detecting engine revolution speed of said engine and generating a first output signal;
   means for detecting engine load on said engine and generating a second output signal;
   control means responsive to said first and second output signals for normally closing said selector valve means, but opening same when the engine revolution speed indicated by said first output signal exceeds a first predetermined engine revolution speed value when a predetermined order component of exhaust noise coincides with a predetermined resonance frequency within said vehicle cabin when said second output signal indicates that the vehicle is at acceleration, said control means being operative to normally close said selector valve means, but opening the selector valve when the engine revolution speed indicated by said first output signal exceeds a second predetermined engine revolution speed value when a second predetermined order component of the exhaust noise coincides with said predetermined resonance frequency within said vehicle cabin when said second output signal indicates that the vehicle is at deceleration.

2. An engine noise suppression system in an automotive vehicle, comprising:

an engine having an even number of cylinders, said engine having a first group of half of the cylinders connected to a first exhaust manifold and a second group of the remaining cylinders connected to a second exhaust manifold, said first and second exhaust manifolds joined at a predetermined portion and having different fluid flow paths in length down to said predetermined portion;

a silencer connected to said first and second exhaust manifolds at said predetermined portion, said silencer including selector valve means whereby an exhaust resistance of said silencer is altered;

means for detecting an engine revolution speed of said engine and generating a first output signal responsive thereto;

means for detecting an engine load on said engine and generating a second output signal responsive thereto;

control means responsive to said first and second output signals for closing said selector valve means and for opening said selector valve means responsive to simultaneously detecting (a) the engine revolution speed indicated by said first output signal exceeding a first predetermined engine revolution speed value, (b) a predetermined order component of exhaust noise coincides with a predetermined resonance frequency within said vehicle and (c) said second output signal indicating that the vehicle is accelerating, said control means further operative to open said selector valve means in response to simultaneously detecting (a) the engine revolution speed indicated by said first output signal exceeding a second predetermined engine revolution speed value, (b) a second predetermined order component of the exhaust noise coinciding with said predetermined resonance frequency within said vehicle and (c) said second output signal indicating that the vehicle is decelerating.

* * * * *